UNITED STATES PATENT OFFICE.

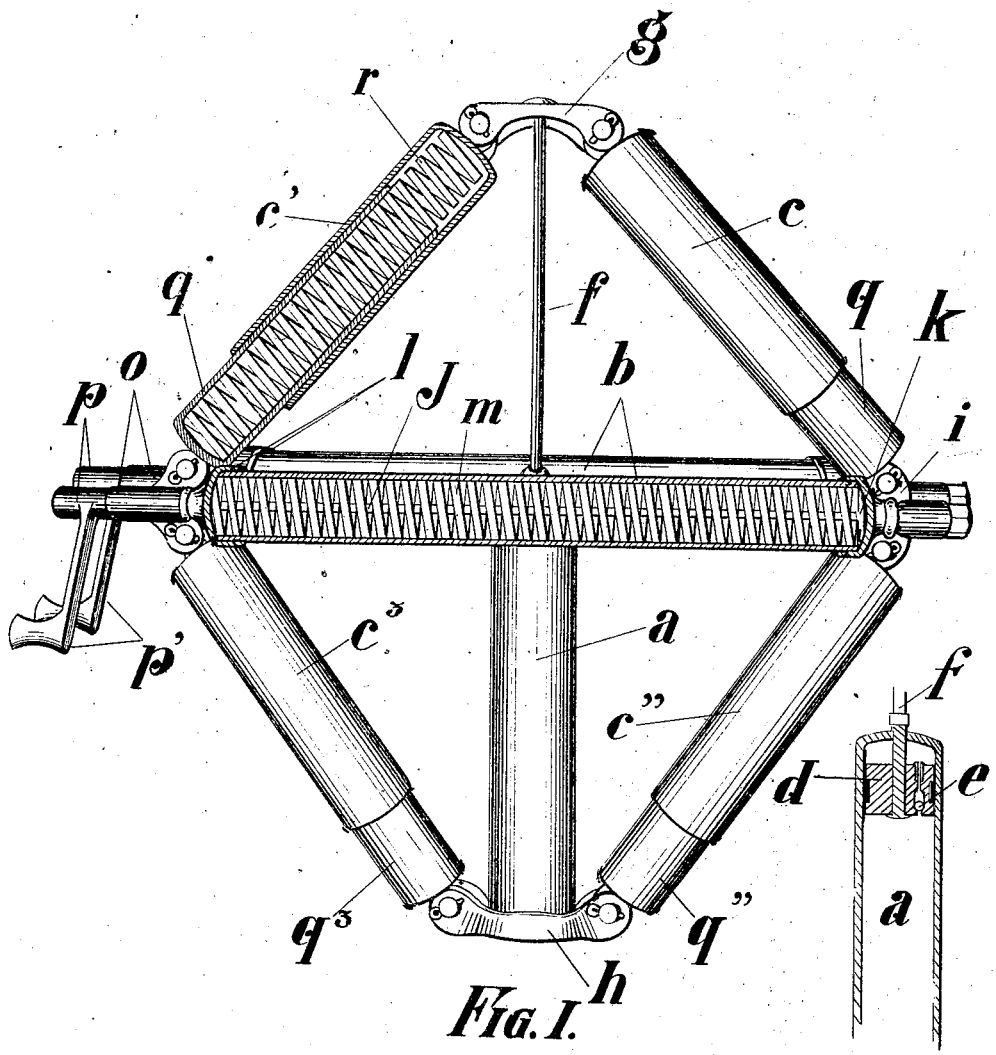

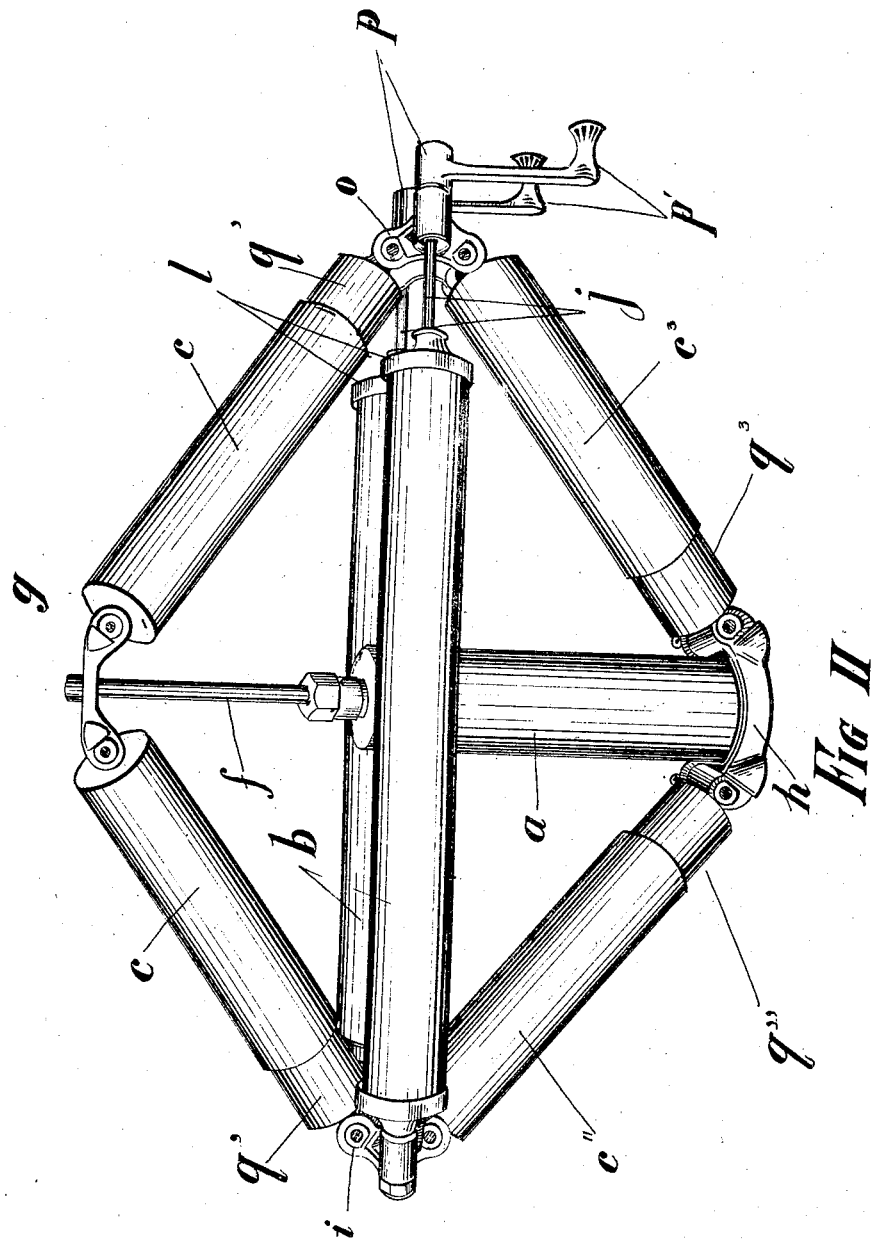

HENRY DIXON, OF TORONTO, ONTARIO, CANADA.

SHOCK-ABSORBER.

1,189,354.  Specification of Letters Patent.  Patented July 4, 1916.

Application filed April 9, 1915. Serial No. 20,199.

*To all whom it may concern:*

Be it known that I, HENRY DIXON, a British subject, residing at the city of Toronto, in the county of York, in the Province of Ontario, Dominion of Canada, have invented certain new and useful Improvements in Shock-Absorbers; and I hereby declare that the following is a full, clear, and exact description of the same.

This invention relates to a shock absorber which will combine in its functions those of the ordinary vehicle spring and shock retarder, the object of the invention being to so arrange the parts that they will offer a controllable and variable resistance when moving, as a result of concussion or excess load; this object being attained by the employment of a set of obliquely arranged set of springs contained in cylindrical casings arranged as a toggle, or toggles, so converging as to exert a normal lifting force upon the load, the cylindrical casings and the springs in the case of an excess load or as a result of concussion being brought into a straight line, or approximately so, to increase the normal tension and angle of convergence of the springs, whereby their direct pressure upon the load will decrease in the same ratio as the increase of tension resulting from the compression, so that the same degree of elasticity may be maintained between the extremities of the movement, and the sudden bound and rebound of the load may be prevented.

In the drawings:—Figure 1, is an elevation, partly in section, of the shock absorber, showing the relation of the various parts in their normal position; and, Fig. 2, is a perspective view showing the position of the parts when compressed; and Fig. 3 is a vertical section of the air cylinder.

Like characters of reference refer to like parts throughout the specification and drawings.

The shock absorber consists essentially of an air cylinder $a$; two horizontal spring cylinders $b$, located on opposite sides of the air cylinder $a$ and in close proximity thereto; and four inclined spring cylinders $c$, $c'$, $c''$ and $c^3$ respectively, arranged as hereinafter described.

The air cylinder $a$ is provided with a piston $d$ having a ball valve $e$ by which air can pass from one side of the piston to the other during its movement within the air cylinder $a$. The piston is provided with a piston rod $f$, the length of which is substantially the same as the length of the air cylinder $a$. Connected to the outer end of the piston rod $f$ is a crown yoke $g$, and connected to the outer end of the air cylinder $a$ is a base yoke $h$. Connected to one end of the horizontal cylinders $b$ is a side yoke $i$, and within each of the horizontal cylinders $b$ is a plunger rod $j$ having at its inner end a washer $k$. Coiled around the plunger rods $j$ between the washers $k$ and the cylinder heads $l$ are springs $m$ compressed by the outward movement of the plunger rods. The plunger rods $j$ extend beyond the cylinder heads $l$ and through the side yoke $o$ and their outer ends are threaded to receive the tensioning nuts $p$ provided with cranks $p'$ for adjustment upon the plunger rods. By screwing the nuts in the direction of the cylinder heads $l$ the tension of the springs $m$ is increased, and by screwing them in the opposite direction the tension of the springs $m$ is decreased.

Within each of the spring cylinders $c$, $c'$, $c''$ and $c^3$ is a cylindrical member $q$, $q'$, $q''$ and $q^3$ respectively, and bearing against the ends of these cylinders and cylindrical members are springs $r$. The cylindrical member $q$ is pivoted to the side yoke $i$ and the cylinder $c$ is pivoted to the crown yoke $g$. The cylinder $c'$ is pivoted to the crown yoke $g$ and the cylindrical member $q'$ is pivoted to the side yoke $o$. The cylinder $c''$ is pivoted to the side yoke $i$ and the cylindrical member $q''$ is pivoted to the base yoke $h$. The cylinder $c^3$ is pivoted to the side yoke $o$ and the cylindrical member $q^3$ is pivoted to the base yoke $h$.

The normal position of the parts is that shown in Fig. 1, in which the cylinders $c$, $c'$ with the springs contained therein converge toward the crown yoke $g$ and the cylindrical members $q''$, $q^3$, with the springs contained therein, converge toward the base yoke $h$ to form acute angles. In this position, the springs and cylinders, while obliquely arranged, approximate most nearly to the perpendicular and the springs are then in their expanded condition; the tension of the springs being such as to support the normal load upon them. When subjected to excess load or concussion, the spring cylinders and cylindrical members straighten out in the manner of a toggle and exert relatively great endwise pressure on the various yokes, which is utilized to compress the springs and increase their natural force in the ratio of their compression, but as the toggles formed by these cylinders straighten out, the direct pressure of the springs upon the load decreases in substantially the same ratio as their force increases, thus maintaining a uniform lifting force upon the load during the movement of the spring cylinders between the extremities of their different positions; the movement of the spring cylinders $c$, $c'$, $c''$ and $c^3$ being retarded by the springs $m$ in the horizontal cylinders $b$, and the resistance of the air in the air cylinder $a$. The effect of this construction is that the movement of the spring cylinders $c$, $c'$, $c''$ and $c^3$ into a straight line is gradually retarded with an increasing resistance, and, reversely, the return of the spring cylinders to a normal position is effected by a gradually diminishing force. Thus it is possible to eliminate the sudden bound and rebound of the vehicle body during the flection of the springs resulting from concussion.

The yoke $o$ is loose on the plunger rods $j$ so that these plunger rods can move freely through it for the adjustment of the nuts $p$ when increasing or decreasing the tension of the springs $m$ in the horizontal cylinders $b$; the purpose of this adjustment being to regulate the tension of the springs $m$ to the approximate load which the vehicle is intended to carry.

The base yoke $h$ is fixed to the air cylinder $a$; the crown yoke $g$ is fixed to the piston rod $f$; the side yoke $i$ is fixed to the horizontal cylinders $b$, at the opposite end to the movable yoke $o$. During the movement of the piston rod $f$, the cylinders $c$, $c'$ press outwardly in the direction of the side yokes $i$ and $o$, and the cylinders $c''$ and $c^3$ press inwardly in the direction of the base yoke $h$, sliding over their respective cylindrical members $q$, $q'$, $q''$ and $q^3$ as the piston rod recedes within the air cylinder $a$, so that the straightening movement of the spring cylinders will not in any way operate to change the path of the piston and piston rods during their inward movement; and, reversely, the spring cylinders, as they return to their normal positions, slide outwardly on their respective cylindrical members.

It is estimated that, in the construction shown in the drawings, a compression of one and one eighth inches of the springs $r$ will cause a compression of two and one quarter inches of the springs $m$ and effect an inward movement of seven inches of the piston rod $f$, thus allowing a sufficient flection of the device for the normal movements of the vehicle.

What I claim is:—

1. A shock absorber comprising a set of obliquely-arranged springs converging to exert a normal lifting force upon the load, and means for increasing their tension, comprising a retarding spring with which the diverging ends of the lifting springs are connected, causing their inward and resisting their outward movement, whereby the direct pressure of the lifting springs upon the load decreases in substantially the same ratio as the force resulting from their increase of tension.

2. A shock absorber comprising a set of obliquely-arranged springs converging to exert a normal lifting force upon the load, and a retarding spring, with which the diverging ends of the lifting springs are slidably connected causing their inward and resisting their outward movement, whereby the direct pressure of the lifting springs upon the load decreases in the same ratio as their increase of tension.

3. A shock absorber comprising a set of obliquely-arranged springs converging to exert a normal lifting force upon the load, means for increasing their tension, comprising a retarding spring with which the diverging ends of the lifting springs are connected, causing their inward and resisting their outward movement, whereby the direct pressure of the lifting springs upon the load decreases in substantially the same ratio as the force resulting from their increase of tension, and means for varying the tension of the retarding spring.

4. A shock absorber comprising a set of obliquely-arranged springs converging to exert a normal lifting force upon the load, a retarding spring, with which the diverging ends of the lifting springs are slidably connected, causing their inward and resisting their outward movement, whereby the direct pressure of the lifting springs upon the load decreases in substantially the same ratio as their increase of tension, and means for varying the tension of the retarding spring.

5. A shock absorber comprising an air cushion having a piston rod extending therefrom, a cylindrical casing having a retarding spring therein, and two obliquely arranged spring-containing cylinders pivotally connected to the piston rod at their converging ends, one of the obliquely arranged cylinders being pivotally connected to one end of the cylindrical casing, and the other obliquely arranged cylinder being slidably connected with the retarding spring within said cylindrical casing.

6. A shock absorber comprising an air cylinder having a valve controlled piston therein with a piston rod extending through one end of the air cylinder, a pair of horizontally arranged cylinders located one on either side of the air cylinder, retarding springs contained within said horizontal cylinders, plunger rods within said horizontal cylinders for compressing the retarding springs, said plunger rods extending beyond the horizontal cylinders, obliquely arranged spring-containing casings pivotally connected at their converging ends with the piston rod of the air cylinder, one of said obliquely arranged springs being pivotally connected at the other end with the plunger rods of the horizontal cylinders and the other of the obliquely arranged springs being connected to the horizontal cylinders.

7. A shock absorber comprising an air cylinder having a valve controlled piston therein, and a piston rod extending beyond one end of the air cylinder, a yoke fixed to the opposite end of the air cylinder, and a yoke fixed to the outer end of the piston rod, in combination with a pair of cylindrical casings, located one on either side of the air cylinder, a yoke fixedly connected to one end of the horizontal cylinders, retarding springs within said horizontal cylinders, plunger rods for compressing the retarding springs, said plunger rods extending beyond the horizontal cylinders, a yoke loosely mounted upon said plungers, tensioning means for the retarding springs mounted upon said plungers and engaging the yoke thereon, cylindrical casings consisting of slidable members pivotally connected to said yokes and springs contained within said cylindrical casings.

Toronto, February 15th, 1915.

HENRY DIXON.

Witnesses:
STANLEY RICHES,
N. C. URQUHART.